US012746657B2

(12) United States Patent
Hsieh

(10) Patent No.: US 12,746,657 B2
(45) Date of Patent: Sep. 29, 2026

(54) TOOL ORGANIZATION BOARD

(71) Applicant: Chih-Chien Hsieh, Taichung City (TW)

(72) Inventor: Chih-Chien Hsieh, Taichung City (TW)

( * ) Notice: Subject to any disclaimer, the term of this patent is extended or adjusted under 35 U.S.C. 154(b) by 0 days.

(21) Appl. No.: 18/914,262

(22) Filed: Oct. 14, 2024

(65) Prior Publication Data

US 2026/0102895 A1 Apr. 16, 2026

(51) Int. Cl.
*B25H 3/00* (2006.01)
*B65D 25/10* (2006.01)

(52) U.S. Cl.
CPC ........... *B25H 3/003* (2013.01); *B65D 25/105* (2013.01)

(58) Field of Classification Search
CPC ... B25H 3/00; B25H 3/02; B25H 3/04; B25H 3/06; B25H 3/003; B25H 3/021; B65D 25/105
See application file for complete search history.

(56) References Cited

U.S. PATENT DOCUMENTS 5,794,543 A * 8/1998 John .................. B65D 19/0022 108/56.1
6,048,503 A * 4/2000 Riley ........................ A61L 2/26 422/26
6,244,447 B1 * 6/2001 Frieze ....................... A61L 2/26 206/370
6,331,280 B1 * 12/2001 Wood ........................ A61L 2/26 206/268
6,436,357 B1 * 8/2002 Frieze ........................ A61L 2/26 422/292
7,246,704 B2 * 7/2007 Brunson ................ B25H 3/003 220/23.88
7,424,958 B1 * 9/2008 Eley ....................... A47F 5/0815 211/70.6
7,806,264 B1 * 10/2010 Lai ......................... B25H 3/003 206/375
8,371,444 B1 * 2/2013 Huang .................. B25H 3/003 206/374
8,505,720 B2 * 8/2013 Huang .................. B65D 85/00 206/349
9,193,063 B2 * 11/2015 Huang ...................... F16B 2/14
(Continued)

FOREIGN PATENT DOCUMENTS

AU 2014377017 A1 * 8/2016 ............... B25H 3/02
DE 102012110339 A1 * 11/2013 ........... B65D 25/105
GB 2435437 B * 5/2008 ............. B65D 77/00

*Primary Examiner* — Patrick D Hawn

(57) ABSTRACT

The present invention discloses a tool organization board for receiving an insert clip. The insert clip includes a post and a protrusion, with the protrusion attached to one side of the post. The tool organization board comprises a plate-shaped main body with an upper side and a lower side. The distance between the upper side and the lower side is defined as a first length, while the axial length of the post is defined as a second length. The first length is at least equal to the second length. The main body contains multiple mounting holes, each of which is surrounded by multiple hole walls, and at least every three adjacent hole walls form one mounting hole. The main body forms multiple stop surfaces, each stop surface acting as a stop for the protrusion as it enters the mounting hole, thereby limiting the movement of the insert clip.

4 Claims, 11 Drawing Sheets

(56) References Cited

U.S. PATENT DOCUMENTS

| | | | | |
|---|---|---|---|---|
| 9,625,143 | B2 * | 4/2017 | Hsu | B25H 3/003 |
| 9,975,237 | B2 * | 5/2018 | Norris | B25H 3/06 |
| 10,058,230 | B2 * | 8/2018 | Gobl | B65D 19/0002 |
| 10,256,011 | B2 * | 4/2019 | Rouleau | H02G 3/32 |
| 10,315,200 | B2 * | 6/2019 | Abebaw | B25H 3/06 |
| 10,618,159 | B2 * | 4/2020 | Maruzzo | B25H 3/04 |
| 11,717,954 | B2 * | 8/2023 | Heath | B25H 3/02 206/372 |
| 11,759,942 | B2 * | 9/2023 | Hohl | B25H 3/06 206/379 |
| 12,134,180 | B2 * | 11/2024 | Burns | B25H 3/02 |
| 2009/0297293 | A1 * | 12/2009 | Chang | B65D 25/105 411/427 |
| 2011/0056858 | A1 * | 3/2011 | Benczkowski | B65D 25/108 220/507 |
| 2015/0258678 | A1 * | 9/2015 | Wang | B25H 3/06 206/349 |
| 2018/0001468 | A1 * | 1/2018 | Pang | B25H 3/06 |

* cited by examiner

TOOL ORGANIZATION BOARD

FIELD OF INVENTION

The present invention relates to a tool positioning device, in particular to a tool organization board.

BACKGROUND OF THE INVENTION

Toolboxes are commonly used to store sockets, wrenches, and other hand tools. To individually position each tool for easy access, one or more tool organizers can be placed inside the toolbox.

U.S. Patent Document U.S. Pat. No. 8,505,720B2 discloses a positioning pad with multiple position holes. Each hole is rectangular, having two long sides and two short sides, and is capable of receiving a holder member. The holder member consists of a flange, a holder unit, and a post unit. The holder unit is connected to one side of the flange and the post unit is connected to the other side. The holder unit is used for tool insertion, and the post unit consists of a cylindrical neck that is axially connected to a plate unit. The neck is connected to the flange, with a diameter equal to or less than the width of the short side of the position hole. The plate unit, a rectangular plate, mates with the rectangular position hole.

To insert the holder member into the positioning pad, the plate unit is vertically aligned with a position hole to match the rectangular shape of the hole. The post unit is inserted downwardly into the hole so that the plate unit exits the position hole from the bottom of the positioning pad with the flange resting on the top. The holder member is then rotated to align the long side of the plate unit with the short side of the hole. This rotation locks the holder member in place as the bottom of the positioning pad prevents the plate unit from moving back upwardly, completing the insertion process. At this time, a socket can be inserted into the holder unit for positioning.

Other positioning tools, such as an elongated plate, can also be mounted on the holder unit. Multiple elongated plates can be mounted on the holder units of different holder members to clamp and position wrenches or other tools, and the positioning tool may also take other forms. The holder unit of the holder member may be formed as a clamp shape allowing multiple holder members to clamp the tool together. Alternatively, the tool may also be equipped with the post unit for direct positioning on the positioning pad.

In order for the holder member to operate and rotate, the plate unit must extend through the bottom of the positioning pad over the position hole. The bottom of the pad acts as a stop for the plate unit. However, having the plate unit extending below the pad, the overall stability of the positioning pad may be compromised.

SUMMARY OF THE INVENTION

The main purpose of the present invention is to provide a tool organization board.

To achieve the aforementioned purpose, the present invention adopts the following technical solution:

A tool organization board, used for receiving an insert clip, the insert clip comprising a disc-shaped flange, a post, a protrusion, and a tool holder, wherein the disc-shaped flange connects the upper end of the post to the lower end of the tool holder, the protrusion is attached to one side of the post and positioned between the two ends of the post, and the tool holder is used for positioning a tool;

the tool organization board includes a plate-shaped main body with an upper side and a lower side, both of which are preferably flat and parallel to each other, the upper and lower sides are positioned opposite each other along the thickness of the main body, the distance between the upper side and the lower side is defined as a first length, while the axial length of the post is defined as a second length, the first length is at least equal to the second length; the main body contains multiple mounting holes each surrounded by multiple hole walls, at least every three adjacent hole walls forming one mounting hole; the width of each hole wall is uniform, and the angle between any two adjacent hole walls is also equal;

among the multiple hole walls around the perimeter of each mounting hole, at least one hole wall forms a stop surface, each stop surface extends radially along the mounting hole, the distance from each stop surface to the upper side of the main body is defined as a first distance, and the shortest distance between the protrusion and the disc-shaped flange is defined as a second distance, the first distance being at most equal to the second distance, each stop surface acts as a stop for the protrusion as it enters the mounting hole, thereby limiting the movement of the insert clip.

When the insert clip is positioned in any one of the mounting holes, the main body can be stably and steadily placed on a plane, thereby stably positioning the main body.

DETAILED DESCRIPTION OF THE PREFERRED EMBODIMENTS

Figure 1:
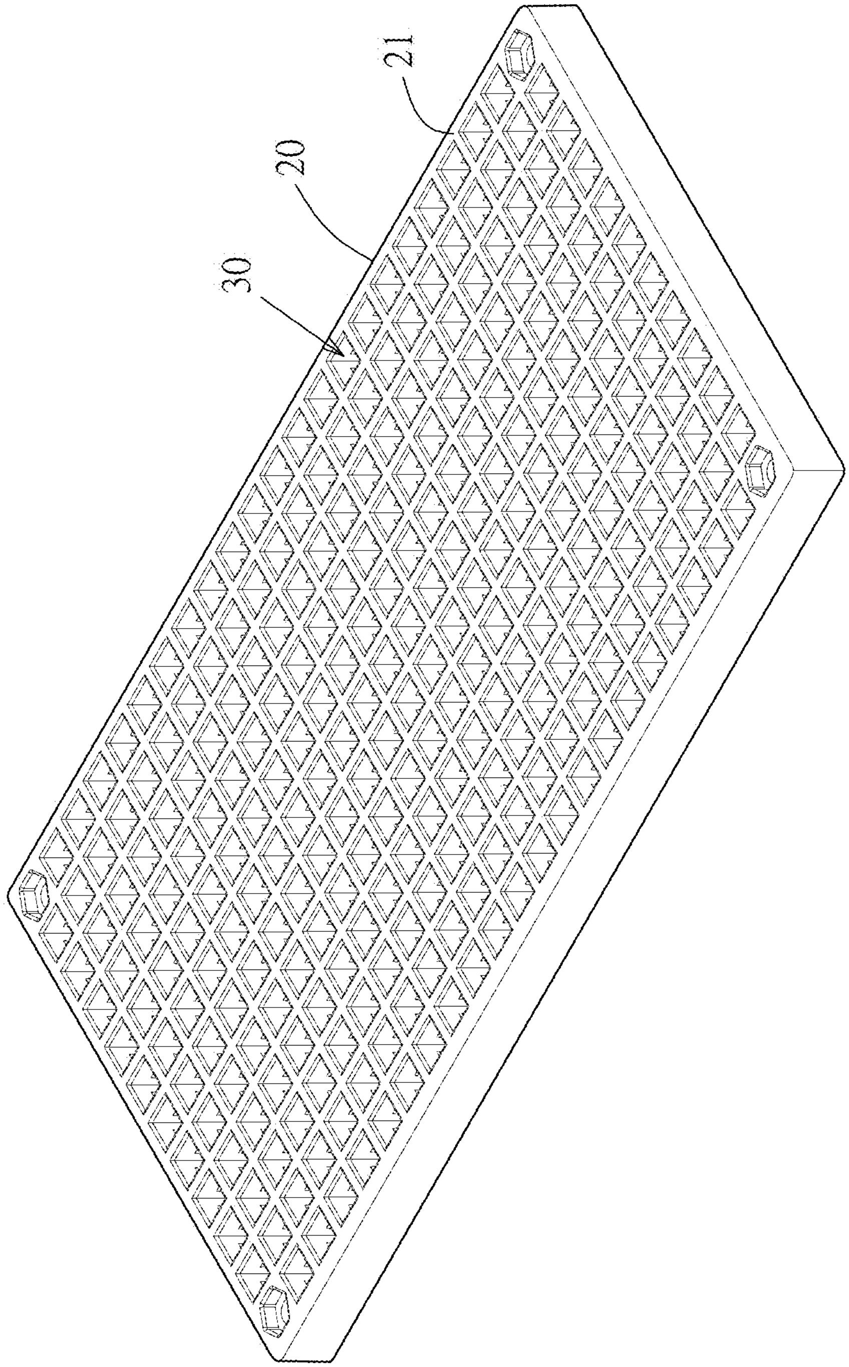
FIG. 1 is a perspective view of a preferred embodiment of the present invention.
Figure 2:
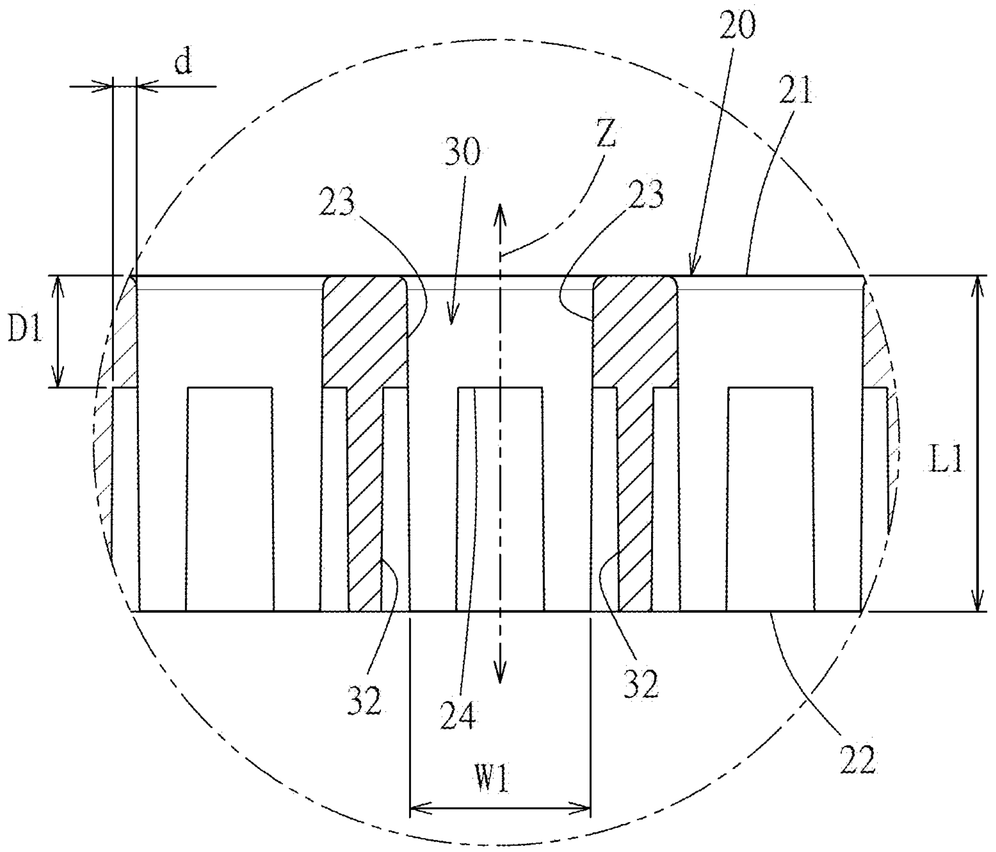
FIG. 2 is a partial sectional view of the preferred embodiment of the present invention.
Figure 3:
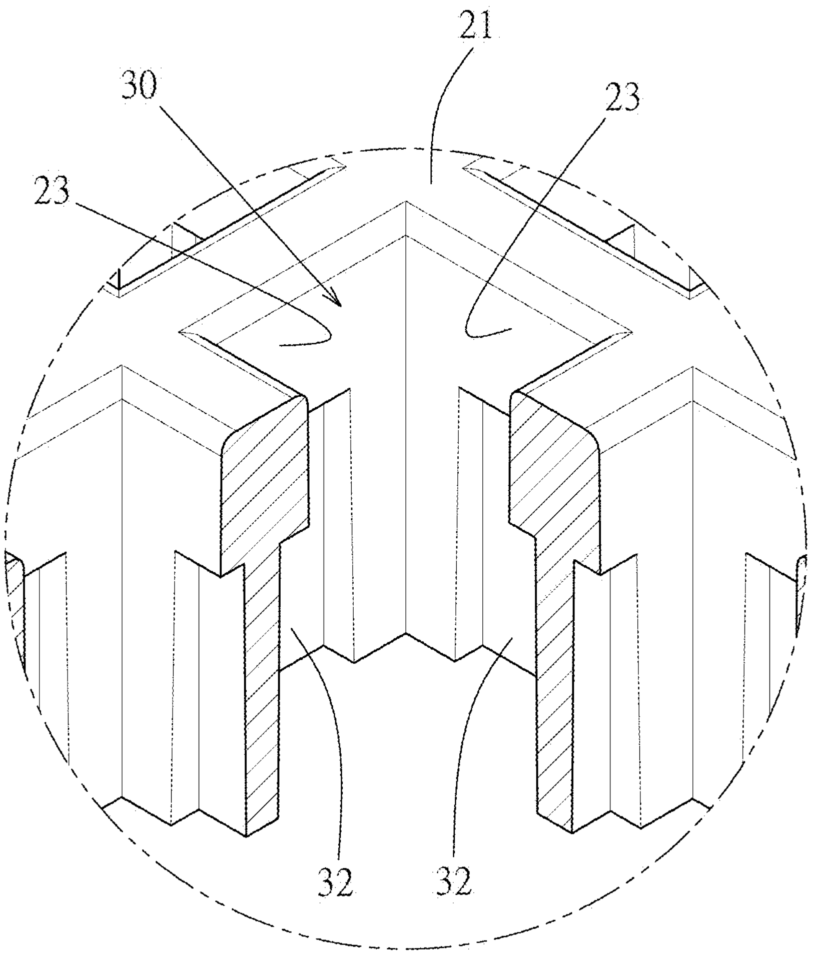
FIG. 3 is a partial perspective sectional view of the preferred embodiment of the present invention.
Figure 4:
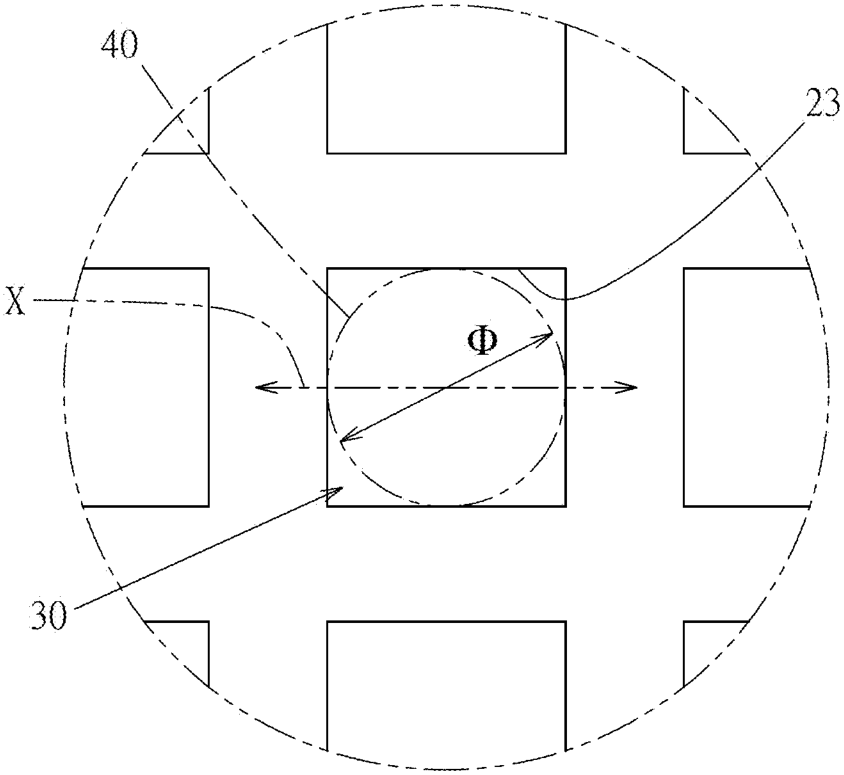
FIG. 4 is a partial top view of the preferred embodiment of the present invention.
Figure 5:
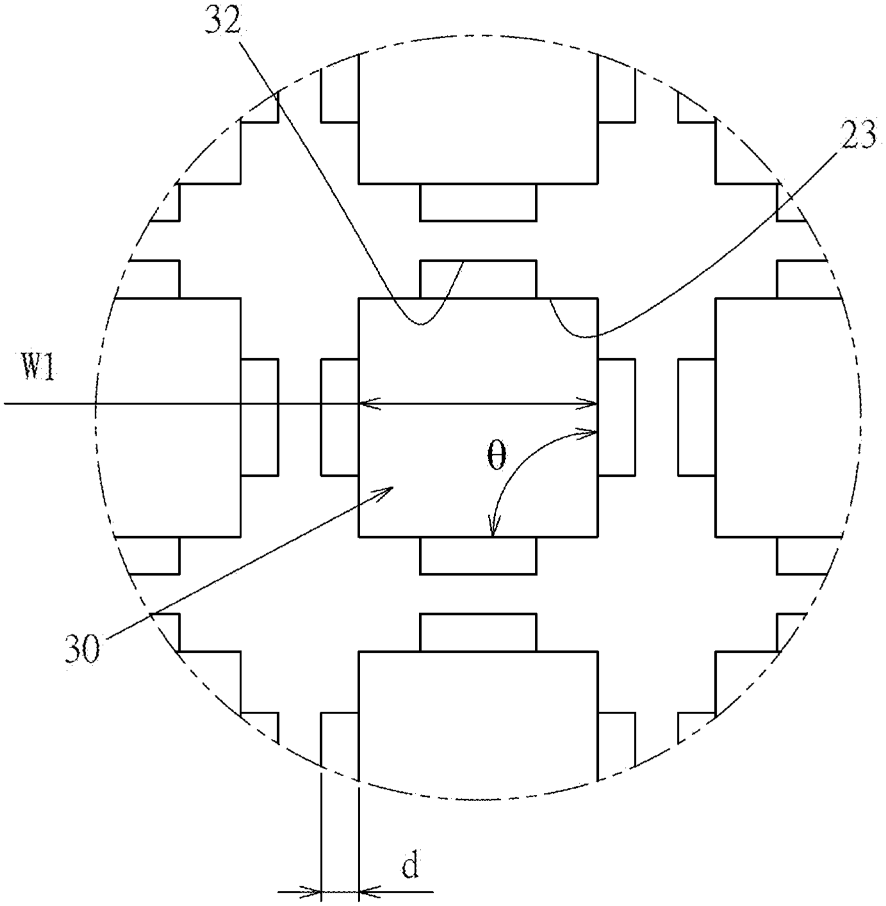
FIG. 5 is a partial bottom view of the preferred embodiment of the present invention.
Figure 6:
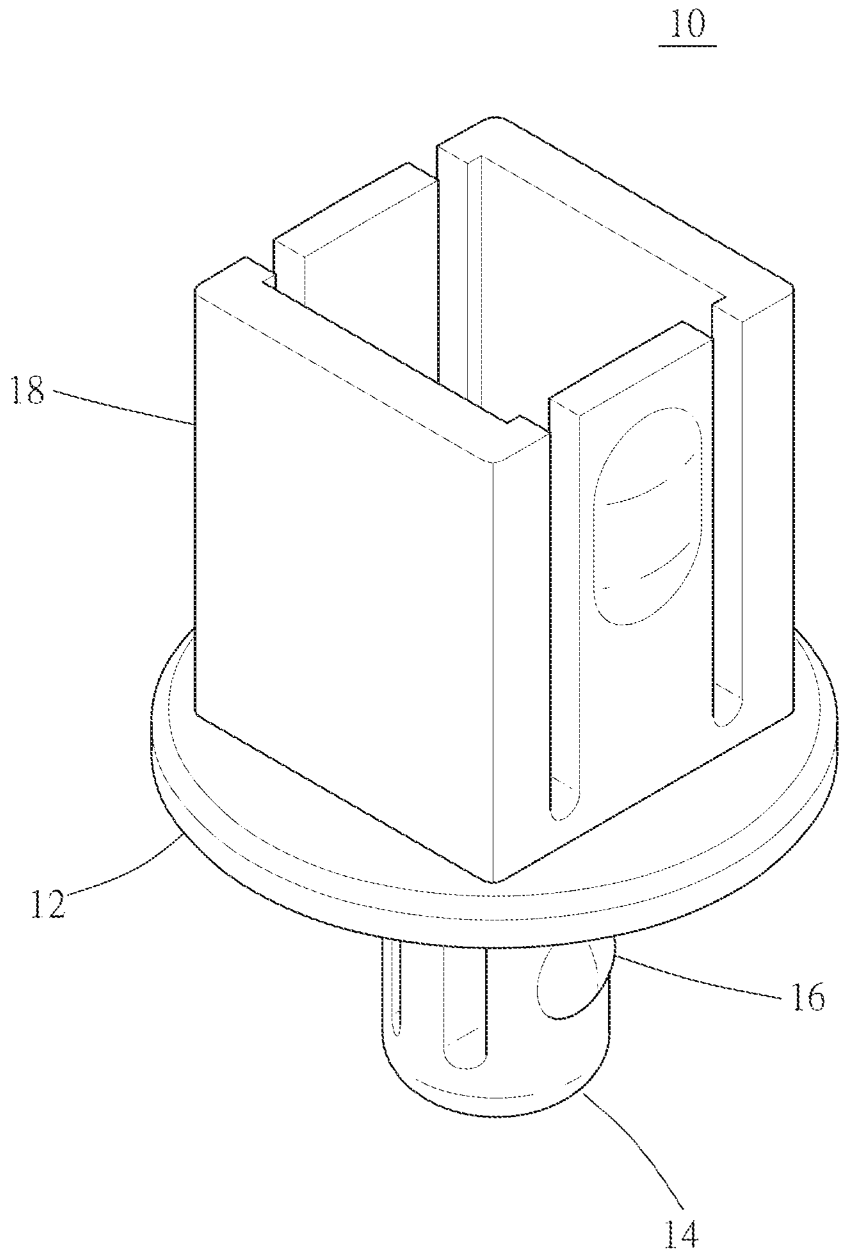
FIG. 6 is a perspective view of the insert clip applied to the preferred embodiment of the present invention.
Figure 7:
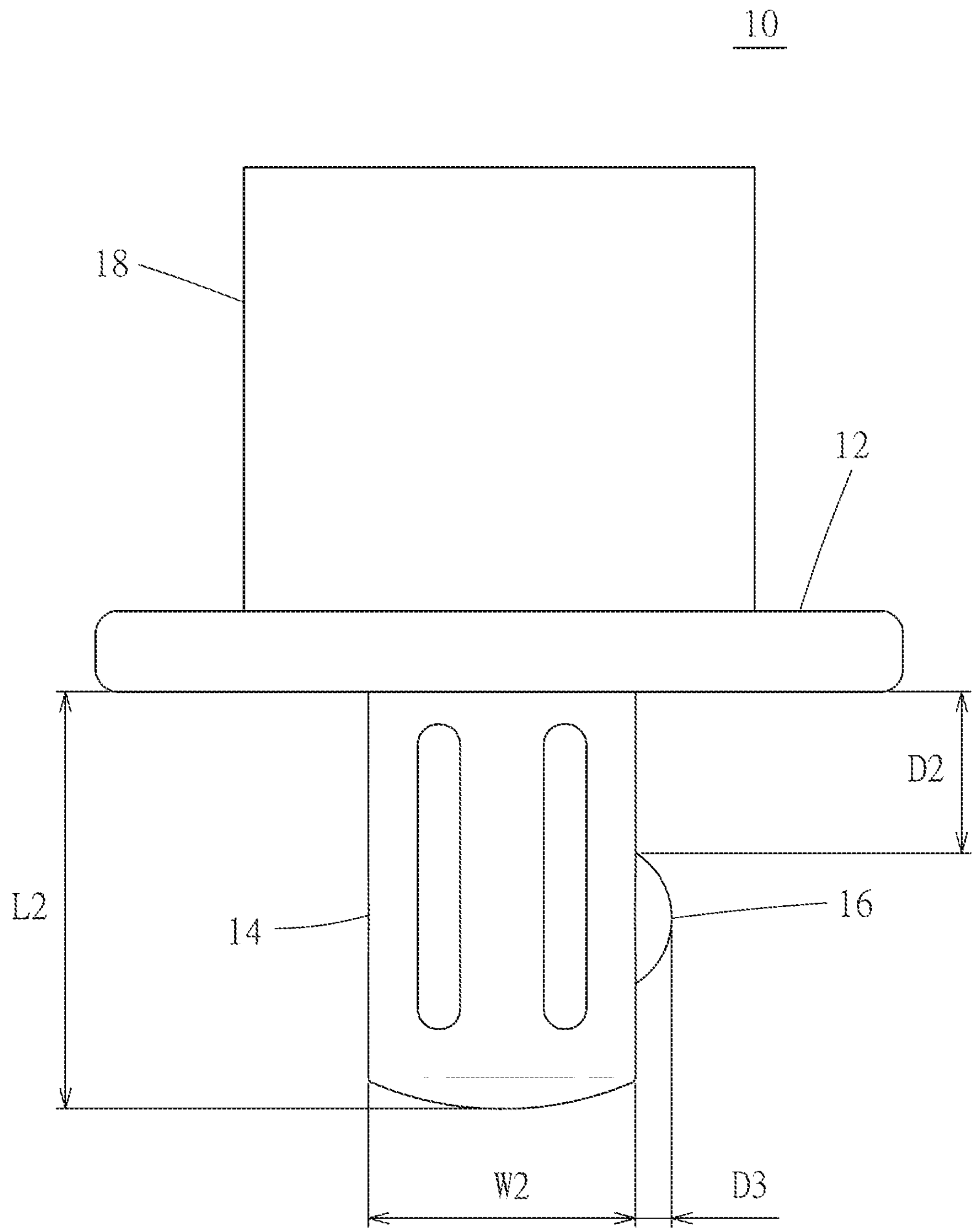
FIG. 7 is a front view of the insert clip applied to the preferred embodiment of the present invention.
Figure 8:
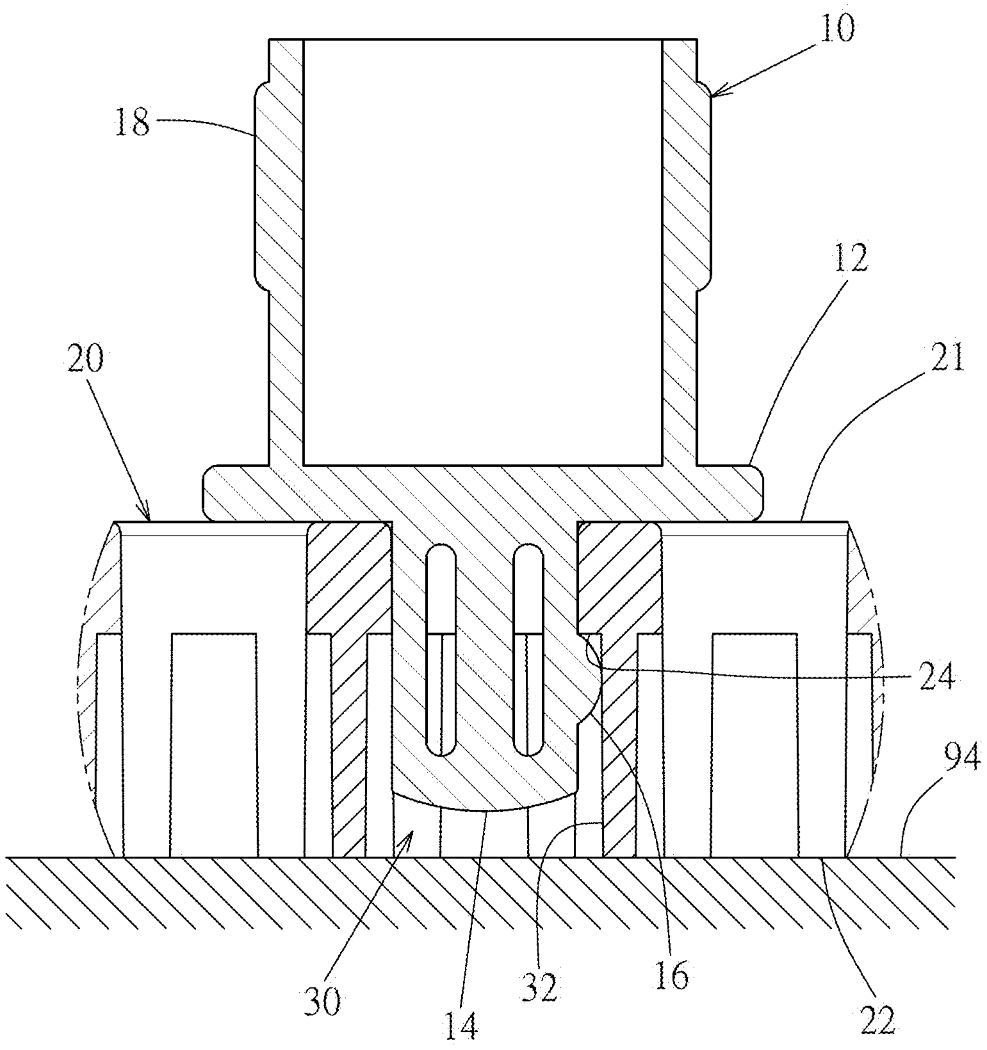
FIG. 8 is a partial sectional view showing the insert clip fitted in the preferred embodiment of the present invention.

As shown in FIGS. 1 to 8, the said tool organization board is designed to receive one or more insert clips 10. Each insert clip 10 consists of a disc-shaped flange 12, a post 14, a protrusion 16, and a tool holder 18. The disc-shaped flange 12 connects the upper end of the post 14 to the lower end of the tool holder 18. The protrusion 16 is attached to one side of the post 14, positioned between its two ends, and has a preferably spherical arc-shaped outer surface. The tool holder 18 is used to position a tool 92, and may also be incorporated as part of the tool 92 itself.

In a preferred embodiment, the tool organization board includes a plate-shaped main body 20 with an upper side 21 and a lower side 22, both preferably flat and parallel to each other. The upper and lower sides 21, 22 are positioned opposite each other along the thickness of the main body 20. The distance between the upper side 21 and the lower side 22 is defined as a first length L1, while the axial length of the post 14 is defined as a second length L2. The first length L1 is at least equal to, and preferably slightly greater than, the second length L2.

The main body 20 contains multiple mounting holes 30, each surrounded by multiple hole walls 23. Four adjacent hole walls 23 form one mounting hole 30, making each mounting hole 30 radially square-shaped. The shape of the mounting holes 30 can also be changed to other polygonal shapes, such as triangular or hexagonal. In the present invention, at least three adjacent hole walls 23 form one mounting hole 30.

The width W1 of each hole wall 23 is uniform, and the angle θ between any two adjacent hole walls 23 is also equal.

Among the multiple hole walls 23 around the perimeter of each mounting hole 30, at least one hole wall 23 forms a stop surface 24. Each stop surface 24 extends radially along the mounting hole 30. In this embodiment, each hole wall 23 has one stop surface 24. The distance from each stop surface 24 to the upper side 21 of the main body 20 is defined as a first distance D1. The shortest distance between the protrusion 16 and the disc-shaped flange 12 is defined as a second distance D2. The first distance D1 is at most equal to, and preferably equal to, the second distance D2. This configuration allows each stop surface 24 to act as a stop for the protrusion 16 as it enters the mounting hole 30, thereby limiting the movement of the insert clip 10.

In a preferred embodiment, each hole wall 23 forms one stop surface 24 around the perimeter of each mounting hole 30. When the post 14 is inserted through the upper side 21 into the selected mounting hole 30, each stop surface 24 around the perimeter of the hole can act as a stop for the protrusion 16. This design enhances the convenience of positioning the insert clip 10 on the main body 20.

To position the insert clip 10 on the main body 20, place the insert clip 10 above the main body 20 with the post 14 under the disc-shaped flange 12. Align the insert clip 10 so that the post 14 is inserted through the upper side 21 into the selected mounting hole 30. At this point, the protrusion 16 can face any hole wall 23. Utilizing the protrusion 16, the post 14, or the main body 20 providing the material elasticity of the hole wall 23, the protrusion 16 can therefore move under the stop surface 24. The stop surface 24 then limits the movement of the protrusion 16, preventing the post 14 from moving upwardly and exiting the mounting hole 30, thereby securing the insert clip 10 in place.

The drawings illustrate that the post 14 is preferably a hollow structure capable of radial elastic deformation. During insertion of the post 14 into the selected mounting hole 30, the post 14 can compress and deform radially. This elastic deformation and recovery characteristic of the post 14 allows the protrusion 16 to easily move under the stop surface 24. However, the post 14 is not limited to this hollow deformable structure. The specific construction of the post 14 depicted in the drawings should not be considered a limitation on the scope of the tool organization board of the present invention.

Figure 9:
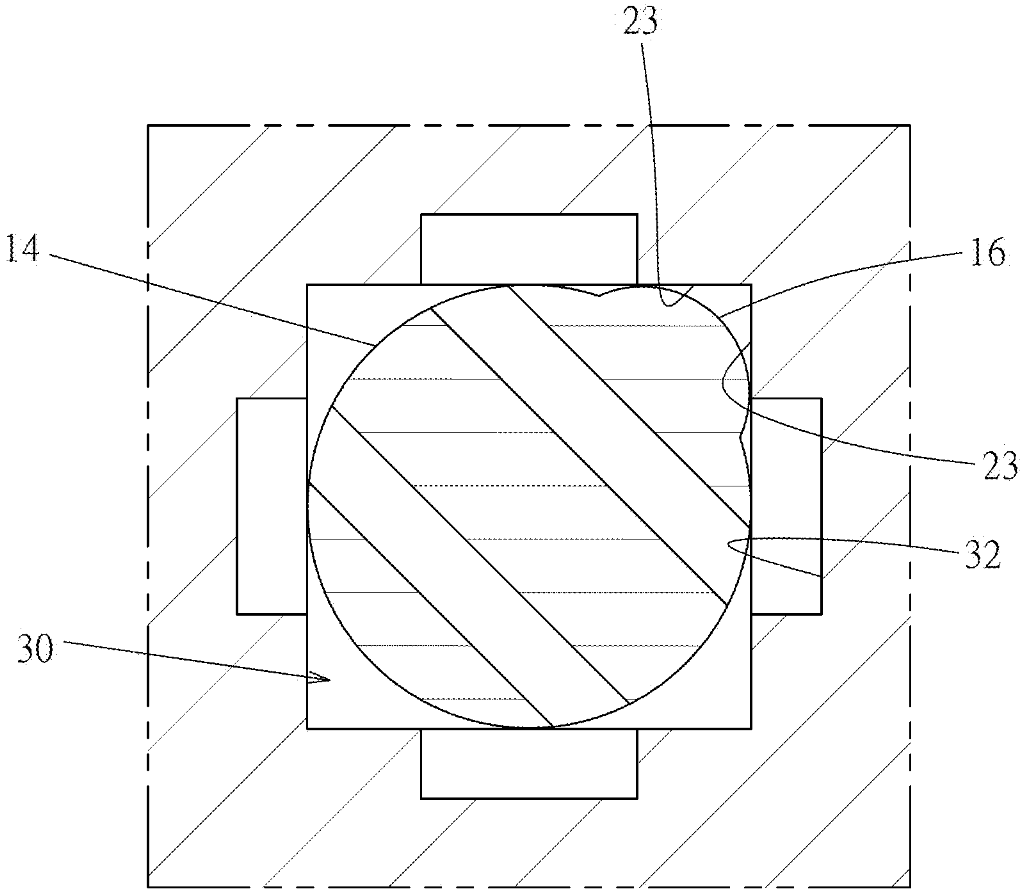
FIG. 9 is a partial sectional view showing the insert clip fitted in the preferred embodiment of the present invention in a bottom view state (I)
Figure 10:
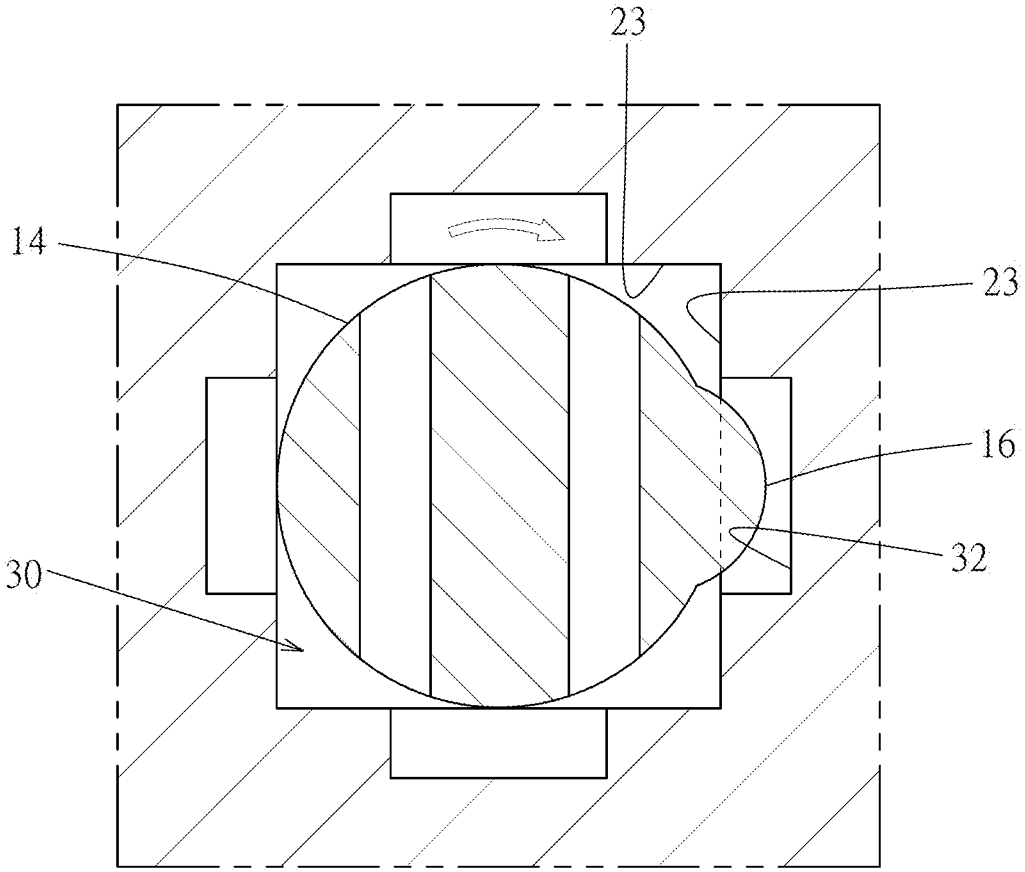
FIG. 10 is a partial sectional view showing the insert clip fitted in the preferred embodiment of the present invention in a bottom view state (II)

To position the insert clip 10 in the selected mounting hole 30, the operation shown in FIG. 9 can be followed. First, align the protrusion 16 with the junction of the two hole walls 23 so that the protrusion 16 can more easily enter the mounting hole 30 along with the post 14 until the disc-shaped flange 12 contacts the upper side 21. Then, as shown in FIG. 10, rotate the insert clip 10 so that the protrusion 16 is moved under the stop surface 24. The stop surface 24 then limits the movement of the protrusion 16, thereby completing the positioning of the insert clip 10.

To remove the insert clip 10 from the main body 20, simply pull the insert clip 10 upwardly. The material elasticity of the protrusion 16, the post 14, or the main body 20 will allow the protrusion 16 to pass over the stop surface 24, allowing the post 14 to exit the mounting hole 30 through the upper side 21. Alternatively, the insert clip 10 may be rotated so that the protrusion 16 aligns with the junction of the two hole walls 23 before being pulled upwardly, allowing the post 14 to exit the mounting hole 30 through the upper side 21.

Since the first length L1 is at least equal to the second length L2, the bottom of the post 14 will not extend beyond the lower side 22 to the underside of the main body 20. When the first distance D1 is equal to the second distance D2, the disc-shaped flange 12 abuts the upper side 21.

The spatial configuration of the mounting hole 30 and the stop surface 24 with respect to the post 14 and the protrusion 16 ensures that when the insert clip 10 is positioned in any mounting hole 30, the post 14 does not extend through the lower side 22 to the underside of the main body 20. This allows the main body 20 to be stably positioned on a flat surface 94, such as a workbench (not shown) or the bottom surface of a toolbox storage compartment (not shown), thereby ensuring stable positioning of the main body 20.

Compared to the positioning pad disclosed in U.S. Patent Document U.S. Pat. No. 8,505,720B2, the main body 20 does not require structures on the lower side 22 for limiting or positioning the insert clip 10, resulting in a more streamlined overall construction.

The mounting hole 30 can receive the insertion and positioning of posts 14 with various radial shapes, including circular, triangular, or even-sided regular polygons. These even-sided regular polygons include, but are not limited to, square and hexagonal shapes. In contrast, the position holes of the prior art positioning pad can only accept post units that conform to specific shapes and dimensions, giving the preferred embodiment a broader range of applications.

The mounting holes 30 are preferably arranged in a matrix distribution, with each hole wall 23 extending to both the upper side 21 and the lower side 22.

A virtual circular line 40 is defined as tangent to each hole wall 23 on the radial perimeter of the selected mounting hole 30, with the diameter direction X of the circular line 40 perpendicular to the axial direction Z of the mounting hole 30. The diameter Φ of the circular line 40 matches the radial width W2 of the post 14, allowing the post 14 to abut each hole wall 23.

The circular line 40 forms an inscribed circle of the radial shape of the mounting hole 30. When the radial shape of the post 14 is circular, as shown in the drawings, it is preferable for the circular line 40 to match that shape. Conversely, when the radial shape of the post 14 is polygonal, it is preferable for the circular line 40 to form a circumscribed circle around the shape of the post 14.

Each hole wall 23 forms a groove 32, preferably extending downwardly to the lower side 22. Each stop surface 24 faces its corresponding groove 32, effectively forming the top wall of each groove 32. The maximum distance between the outer part of the protrusion 16 and the post 14 is defined as a third distance D3. The depth d of each groove 32, measured along the diameter direction X of the mounting hole 30, is at least equal to the third distance D3, and preferably greater, so that the entire protrusion 16 can fully enter the groove 32.

As shown in FIGS. 9 and 10, when the insert clip 10 is rotated to move the protrusion 16 from the position in FIG. 9 to the position in FIG. 10, the hole wall 23 adjacent the groove 32 provides resistance to the protrusion 16 as it enters the groove 32. This resistance provides tactile feedback to the operator's hand, allowing the operator to determine whether the protrusion 16 has successfully entered the groove 32 without the need for visual confirmation. In addition, the junction between the groove 32 and the hole wall 23 serves as a limiting mechanism for the protrusion 16 that has entered the groove 32, making it difficult for the insert clip 10 to rotate unintentionally and for the protrusion 16 to exit the groove 32 unless actively controlled by the user. This feature increases the positioning stability of the insert clip 10.

Figure 11:
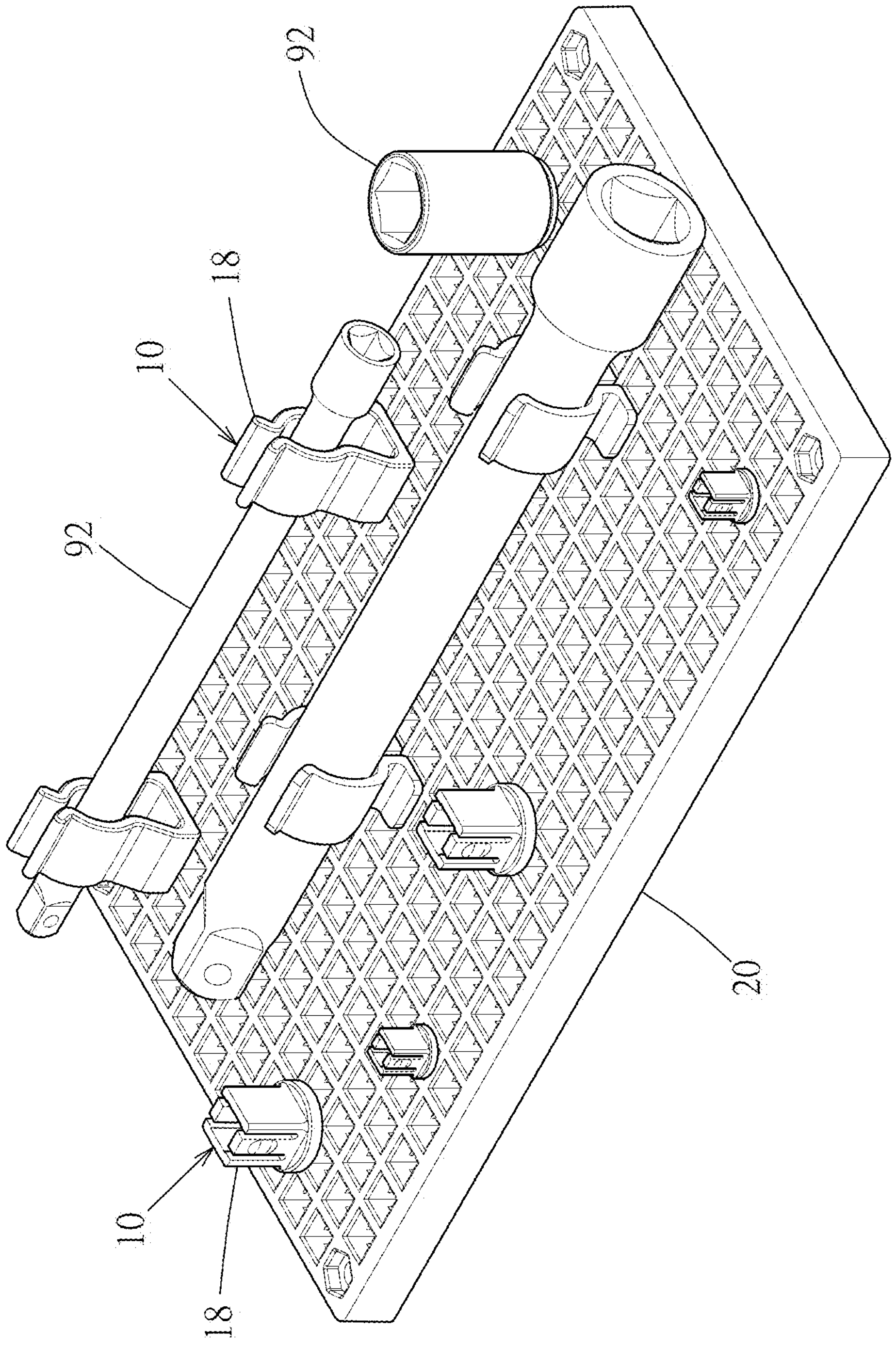
FIG. 11 is a perspective view showing the use state of the preferred embodiment of the present invention.

As shown in FIG. 11, the main body 20 can receive the multiple insert clips 10. The tool holder 18 of each insert clip 10 may vary based on the intended use of the tool 92 it is designed to position, and is not limited to the configurations shown in the drawings.

What is claimed is:

1. A tool organization board, used for receiving an insert clip, the insert clip comprising:

a disc-shaped flange, a post, a protrusion, and a tool holder, wherein the disc-shaped flange connects an upper end of the post to a lower end of the tool holder, the protrusion is attached to a side of the post and positioned between the two ends of the post, and the tool holder is used for positioning a tool;

wherein the tool organization board includes;

a plate-shaped main body with an upper side and a lower side, both of which are flat and parallel to each other, the upper and lower sides positioned opposite each other along a thickness of the main body, a distance between the upper side and the lower side defined as a first length, wherein an axial length of the post is defined as a second length, and the first length is at least equal to the second length;

the main body contains multiple mounting holes each surrounded by multiple hole walls, at least every three adjacent hole walls forming one mounting hole; wherein a width of each hole wall is uniform, and an angle between any two adjacent hole walls is also equal;

among the multiple hole walls around the perimeter of each mounting hole, at least one hole wall forms a stop surface, each stop surface extending radially along the mounting hole, a distance from each stop surface to the upper side of the main body defined as a first distance, and a shortest distance between the protrusion and the disc-shaped flange is defined as a second distance, the first distance being at most equal to the second distance, and each stop surface acts as a stop for the protrusion as it enters the mounting hole, thereby limiting the movement of the insert clip;

wherein a virtual circular line is defined as tangent to each hole wall on the radial perimeter of the selected mounting hole, with a diameter direction of the circular line perpendicular to an axial direction of the mounting hole, and the diameter of the circular line matches a radial width of the post, allowing the post along the second distance to abut each hole wall;

wherein along a thickness direction of the main body, from the stop surface of each hole wall to the lower side, a groove is partially or completely formed; and wherein for each mounting hole, at a first rotational position at a junction of two hole walls the protrusion can be inserted into the mounting hole and aligned with the groove, and at a second rotational position the protrusion is positioned into the groove under the stop surface to prevent removal of the insert clip from the mounting hole.

2. The tool organization board according to claim 1, wherein each hole wall extends to both the upper side and the lower side.

3. The tool organization board according to claim 1, wherein each stop surface faces its corresponding groove, forming a top wall of each groove, wherein a maximum distance between an outer part of the protrusion and the post is defined as a third distance, a depth of each groove, measured along a diameter direction of the mounting hole, is at least equal to the third distance.

4. The tool organization board according to claim 1, wherein each hole wall is formed with one stop surface.

* * * * *